US012762742B2

(12) United States Patent
Ahmed et al.

(10) Patent No.: US 12,762,742 B2
(45) Date of Patent: Oct. 13, 2026

(54) FULLY AUTOMATED ESTIMATION OF SCENE PARAMETERS

(71) Applicant: REMBRAND, INC., Los Altos, CA (US)

(72) Inventors: Ahmed Aly Saad Ahmed, Bothell, WA (US); Sameh Khamis, Alameda, CA (US); Abdelrahman Samir Abdelrahman Mohamed, Redmond, WA (US)

(73) Assignee: REMBRAND, INC.

( * ) Notice: Subject to any disclaimer, the term of this patent is extended or adjusted under 35 U.S.C. 154(b) by 10 days.

(21) Appl. No.: 18/645,121

(22) Filed: Apr. 24, 2024

(65) Prior Publication Data

US 2024/0354993 A1 Oct. 24, 2024

Related U.S. Application Data

(60) Provisional application No. 63/497,985, filed on Apr. 24, 2023.

(51) Int. Cl.
*G06T 7/80* (2017.01)
*G06T 7/50* (2017.01)
(Continued)

(52) U.S. Cl.
CPC .................. *G06T 7/80* (2017.01); *G06T 7/50* (2017.01); *G06T 7/60* (2013.01); *G06T 7/73* (2017.01);
(Continued)

(58) Field of Classification Search
None
See application file for complete search history.

(56) References Cited

U.S. PATENT DOCUMENTS 11,288,543 B1 3/2022 Tovchigrechko
11,494,997 B1 11/2022 Ho
(Continued)

FOREIGN PATENT DOCUMENTS

CA 3158287 A1 5/2021
CN 110287361 B 6/2021
(Continued)

OTHER PUBLICATIONS

International Search Report for Application No. PCT/US2024/026075 dated Aug. 7, 2024.
(Continued)

*Primary Examiner* — Yi Wang
(74) *Attorney, Agent, or Firm* — Squire Patton Boggs LLP; Sarah Mirza

(57) ABSTRACT

One embodiment of the present invention sets forth a technique for performing estimation of scene parameters associated with a two-dimensional (2D) input scene. technique includes identifying, based on the input scene, one or more line segments included in the input scene and generating one or more vanishing points associated with the input scene based on the one or more line segments. The technique also includes estimating, based on the one or more vanishing points, one or more scene parameters associated with the scene and inserting a world object into the input scene based on the one or more scene parameters.

20 Claims, 7 Drawing Sheets

(51) Int. Cl.

| | |
|---|---|
| ***G06T 7/60*** | (2017.01) |
| ***G06T 7/73*** | (2017.01) |
| ***G06T 11/00*** | (2006.01) |
| ***G06T 19/00*** | (2011.01) |
| ***G06V 10/764*** | (2022.01) |
| ***G06V 20/20*** | (2022.01) |
| ***G06V 40/16*** | (2022.01) |

(52) U.S. Cl.
CPC ............ *G06T 11/00* (2013.01); *G06T 19/006* (2013.01); *G06V 10/764* (2022.01); *G06V 20/20* (2022.01); *G06V 40/161* (2022.01); *G06T 2207/30201* (2013.01); *G06T 2207/30244* (2013.01)

(56) References Cited

U.S. PATENT DOCUMENTS

| | | | | |
|---|---|---|---|---|
| 11,514,714 | B1 | 11/2022 | Soltani et al. | |
| 2013/0287318 | A1* | 10/2013 | Shechtman | G06T 3/00 382/289 |
| 2017/0214899 | A1 | 7/2017 | Meier et al. | |
| 2019/0197693 | A1* | 6/2019 | Zagaynov | G06V 30/412 |
| 2021/0283496 | A1 | 9/2021 | Mandella et al. | |
| 2022/0084296 | A1 | 3/2022 | Sadalgi et al. | |
| 2023/0245448 | A1* | 8/2023 | Guo | G06T 7/0006 345/633 |
| 2024/0185449 | A1 | 6/2024 | Bhatt et al. | |
| 2025/0000476 | A1 | 1/2025 | Hansroul | |

FOREIGN PATENT DOCUMENTS

| | | |
|---|---|---|
| JP | 2012244466 A | 12/2012 |
| WO | 2017212490 A1 | 12/2017 |

OTHER PUBLICATIONS

Non-Final Office Action received for U.S. Appl. No. 18/645,194 dated Nov. 3, 2025, 26 pages.
European Search Report received for Application No. 24797859.6 dated May 6, 2026, 7 pages.
Keren et al. “Placing Three-Dimensional Models in an Uncalibrated Single Image of an Architectural Scene”, Proceedings of the ACM Symposium on Virtual Reality Software and Technology, Nov. 11-13, 2002, pp. 186-193.
Tong et al., “Transformer Based Line Segment Classifier with Image Context for Real-Time Vanishing Point Detection in Manhattan World”, IEEE/ CVF Conference no Computer Vision and Pattern Recognition, Jun. 18, 2022, pp. 6093-6102.
Final-Office Action received for U.S. Appl. No. 18/645,194 dated Mar. 9, 2026, 35 pages.
Notice of Allowance received for U.S. Appl. No. 18/645,194 dated Sep. 1, 2026, 23 pages.

* cited by examiner

FULLY AUTOMATED ESTIMATION OF SCENE PARAMETERS

CROSS-REFERENCE TO RELATED APPLICATIONS

This application claims the priority benefit of United States provisional patent application titled, "FULLY AUTOMATED ESTIMATION OF SINGLE-VIEW CAMERA PARAMETERS AND OBJECT SIZE," filed Apr. 24, 2023, and having Ser. No. 63/497,985. The subject matter of this related application is hereby incorporated herein by reference.

BACKGROUND

Field of the Various Embodiments

Embodiments of the present disclosure relate generally to augmented reality (AR) and computer vision, and more specifically to methods and systems for automatically estimating scene parameters, including intrinsic and extrinsic camera parameters and object size in a two-dimensional (2D) image using a single camera view.

Description of the Related Art

In the fields of computer vision, graphics, and the visual effects (VFX) industry, estimating parameters associated with a given scene play a crucial role in various applications, including augmented reality (AR), image-based modeling, and virtual scene reconstruction. Camera parameters are an example of a type of scene parameter that is often estimated in these applications. Camera parameters can be broadly classified into two categories: intrinsic and extrinsic parameters. Intrinsic parameters, such as focal length, sensor size, and principal point, define the internal properties of the camera sensor and the task of estimating them is typically referred to as camera calibration. Extrinsic camera parameters are the parameters of the camera pose or orientation, which in most cases are the camera's rotation and translation in the world coordinate system.

Existing techniques for estimating camera parameters in the VFX industry may rely on either manual input or semi-automated methods. In the computer vision community, approaches based on structure-from-motion (SfM), simultaneous localization and mapping (SLAM), and bundle adjustment have been employed to estimate camera parameters using multiple views of a scene from different camera viewpoints and/or tracking features included in a scene across multiple sequential video frames. One drawback of these techniques is that these methods may be computationally expensive, require a substantial amount of input data, or require multiple cameras to capture suitable input data.

Furthermore, existing techniques may estimate camera parameters from a single image or video frame. These techniques may require manual intervention, as users may need to align vanishing points or provide known reference dimensions within the image or video frame. One drawback of these technique is that these techniques may generate unsuitable results based on error-prone user inputs or may require prior knowledge of physical dimensions associated with one or more objects included in the image or video frame.

Estimating the sizes of objects in a scene is also an important task in the fields of computer vision, graphics, and the VFX industry. Various techniques exist for estimating object sizes in images, which vary based on the information available and the level of precision needed. One approach requires a reference object of known dimensions within the same image plane as the target object, followed by calculating the ratio of pixels per unit length. Alternatively, a multi-camera system can be employed to capture multiple images of an identical scene from different viewpoints, allowing for the triangulation of object depth and relative dimensions. A third technique utilizes camera parameters, such as focal length and sensor size, in conjunction with a formula that correlates the object's image size with its actual size and distance. One drawback of these techniques is that they may require multiple cameras, prior knowledge of intrinsic and/or extrinsic camera parameters, or previously determined object depths and dimensions.

As the foregoing illustrates, what is needed in the art are more effective techniques for estimating camera parameters in single-view video scenes.

SUMMARY

One embodiment of the present invention discloses a technique for performing estimation of scene parameters. The technique includes identifying, based on a two-dimensional (2D) input scene, one or more line segments included in the input scene and generating one or more vanishing points associated with the input scene based on the one or more line segments. The technique further includes estimating, based on the one or more vanishing points, one or more scene parameters associated with the scene and inserting a world object into the input scene based on the one or more scene parameters.

One technical advantage of the disclosed techniques relative to the prior art is that the disclosed techniques provide fully automated determination of scene parameters with minimal manual configuration, improving both accuracy and quality in the generated results. Further, the disclosed techniques may insert an object into the scene while automatically calculating an appropriate size in pixels for the inserted object, improving efficiency in a scene modification workflow. Further, the disclosed techniques require only a single image of a scene generated by a single camera to automatically generate scene parameters, rather than complex, expensive, and error-prone multi-camera capture configurations. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Figure 1:
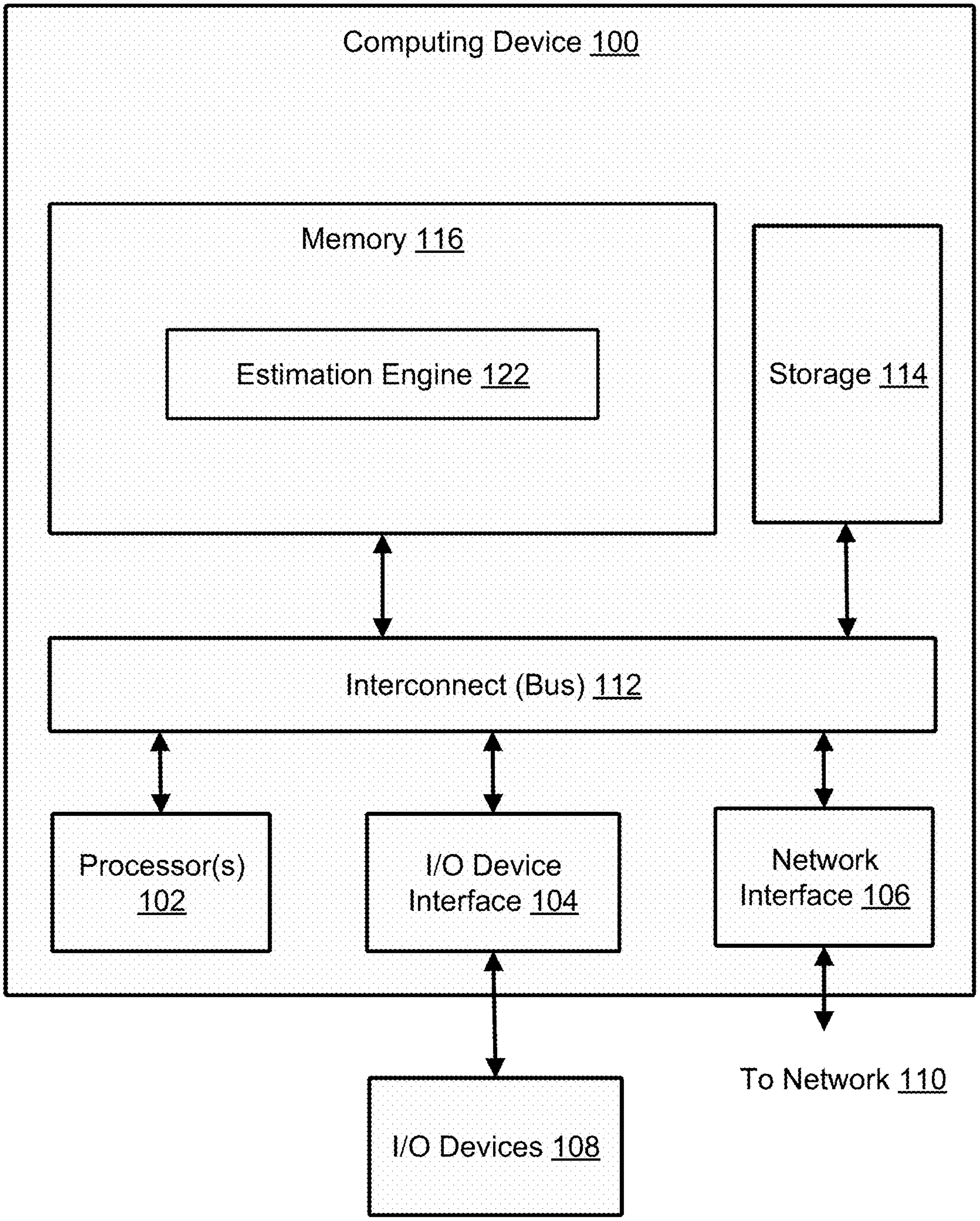
FIG. 1 illustrates a computer system configured to implement one or more aspects of various embodiments.

FIG. 1 illustrates a computing device 100 configured to implement one or more aspects of various embodiments. In one embodiment, computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run an estimation engine 122 that resides in a memory 116.

It is noted that the computing device described herein is illustrative and that any other technically feasible configurations fall within the scope of the present disclosure. For example, multiple instances of estimation engine 122 could execute on a set of nodes in a distributed and/or cloud computing system to implement the functionality of computing device 100. In another example, estimation engine 122 could execute on various sets of hardware, types of devices, or environments to adapt estimation engine 122 to different use cases or applications. In a third example, estimation engine 122 could execute on different computing devices and/or different sets of computing devices.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Estimation engine 122 may be stored in storage 114 and loaded into memory 116 when executed.

Memory 116 includes a random-access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including estimation engine 122.

Parameter Estimation, Object Size Estimation and Object Placement Overview

Figure 2:
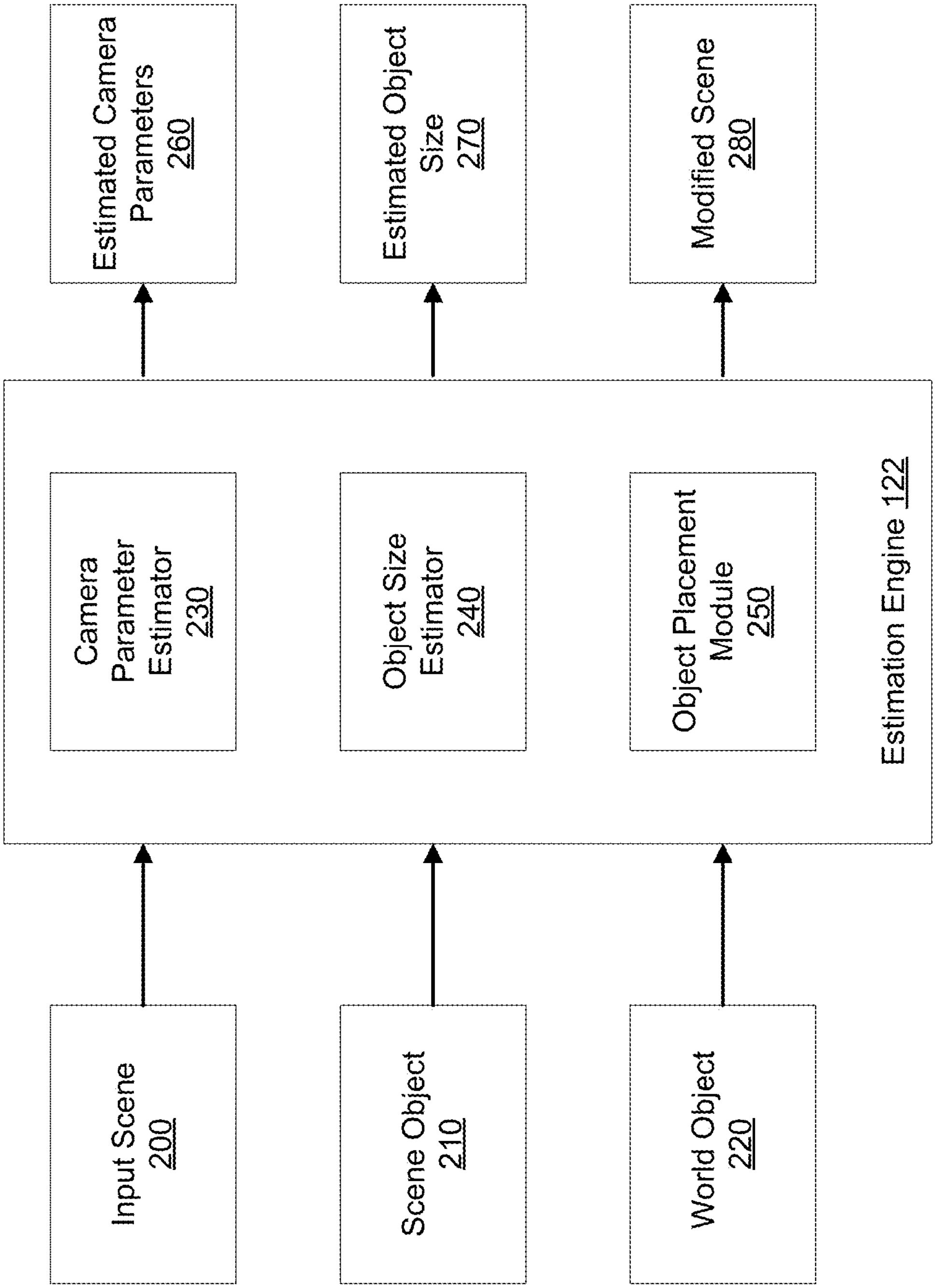
FIG. 2 is a functional block diagram of estimation engine 122 of FIG. 1, according to some embodiments.

FIG. 2 is a functional block diagram of estimation engine 122 of FIG. 1, according to some embodiments. Estimation engine 122 calculates intrinsic and extrinsic parameters associated with a camera based on a 2D representation of a 3D scene captured by the camera. Estimation engine 122 may also determine dimensions in world space associated with an object included in the 2D representation. Estimation engine 122 may further determine an appropriate size in pixels associated with an object to be inserted into the 2D representation. Estimation engine 122 includes, without limitation, camera parameter estimator 230, object size estimator 240, and object placement module 250. In various embodiments, estimation engine 122 may include only a subset of these modules or may include additional modules. Various embodiments may further include multiple instances of one or more of the modules described herein. Estimation engine 122 may receive input scene 200, scene object 210, and/or world object 220, and generate estimated camera parameters 260, calculated object size 270, and/or modified scene 280.

Camera parameter estimator 230 of estimation engine 122 may estimate one or more intrinsic and/or extrinsic camera parameters associated with a camera, based on an input scene 200 captured by the camera (e.g., a two-dimensional (2D) image captured by the camera). The estimated camera extrinsic parameters represent the camera's location and orientation in a 3D world space. The camera's intrinsic parameters, such as focal length and principal point, are inherent to the camera and do not depend on the camera's location or orientation. Intrinsic and extrinsic camera parameters are discussed in more detail in the description of FIG. 3 below.

In various embodiments, camera parameter estimator 230 receives input scene 200. Input scene 200 includes a 2D representation of one or more objects included in a 3D scene captured by the camera. Input scene 200 may include an associated resolution, e.g., an associated height and width expressed as a quantity of pixels. In various embodiments, input scene 200 may be a depiction of a static 3D scene. In other embodiments, input scene 200 may represent a single frame of a video sequence including multiple frames.

In operation, camera parameter estimator 230 identifies a set of 2D line segments included in input scene 200. Via a machine learning model, camera parameter estimator 230 analyzes and groups the identified line segments. Camera parameter estimator 230 determines one or more vanishing points, where each vanishing point is associated with a group of line segments. A vanishing point represents a location where 2D line segments included in input scene 200, which represent parallel lines in the 3D scene, converge or would converge if the line segments were extended infinitely.

Camera parameter estimator 230 aligns the determined vanishing points with three mutually orthogonal axes in world space, e.g., an X axis, a Y axis, and a Z axis. Camera parameter estimator 230 calculates a parameter matrix for the camera based on the aligned vanishing points. In some embodiments, the parameter matrix may be a 4×4 matrix, and elements included in the parameter matrix determine the camera position and orientation in world space.

Based on the line segments, the machine learning model also estimates a relative focal length and a principal point for the camera. The relative focal length of the camera determines an image plane associated with the camera, where the image plane intersects the 3D scene. The principal point for the camera corresponds to the geometric center of the image plane.

Camera parameter estimator 230 generates estimated camera parameters 260 for the camera. Estimated camera parameters 260 include intrinsic parameters, such as the camera's relative focal length and the principal point, and extrinsic parameters, such as the camera's position and orientation in world space as defined by the parameter matrix. Camera parameter estimator 230 is discussed in greater detail in the description of FIG. 4 below.

Object size estimator 240 of estimation engine 122 estimates real-world dimensions for a scene object 210 included in input scene 200. For example, object size estimator 240 may estimate that the real-world dimensions for a painting included in input scene 200 are 24 inches by 36 inches.

Object size estimator 240 estimates dimensions of scene objects based on the presence of one or more depictions of human head(s) included in input scene 200. In operation, object size estimator 240 estimates a real-world object size for an object included in input scene 200 based on the relative sizes of the object and one or more human heads included in input scene 200.

Object size estimator 240 leverages the characteristic that human heads are generally similar in size. For example, the "menton-crinion distance" is defined as the vertical distance between the bottom of the chin (menton) and the midpoint of the hairline (crinion). The average menton-crinion distance for humans is 7.5 inches for men and 7.0 inches for women, and the middle 90 percent of the human population have a menton-crinion distance that is within 0.7 inches of the average. Object size estimator 240 analyzes one or more human heads included in input scene 200 and may estimate real-world dimensions for an object in input scene 200 based on the one or more human heads. Camera parameter estimator 230 is discussed in greater detail in the description of FIG. 4 below.

Estimation engine 122 includes object placement module 250. Object placement module 250 receives world object 220 and input scene 200. World object 220 includes a 2D depiction of an object, one or more associated size dimensions for the object expressed in real-world units, and a desired insertion point within input scene 200 expressed as 2D pixel coordinates. In various embodiments, object placement module 250 may receive depth information associated with input scene 200 and a depth scale from object size estimator 240. In other embodiments, object placement module 250 may independently generate depth information and a depth scale.

Based on input scene 200, the depth information associated with input scene 200, world object 220, the desired insertion point, and the generated depth scale, object placement module 250 calculates pixel dimensions associated with world object 220. Object placement module 250 modifies the size of world object 220 based on the calculated pixel dimensions and inserts world object 220 into input scene 200 at the desired insertion point. Object placement module 250 generates modified scene 280, where modified scene 280 represents input scene 200 as modified by the insertion of world object 220. Object placement module 250 is discussed in greater detail in the description of FIG. 6 below.

Figure 3:
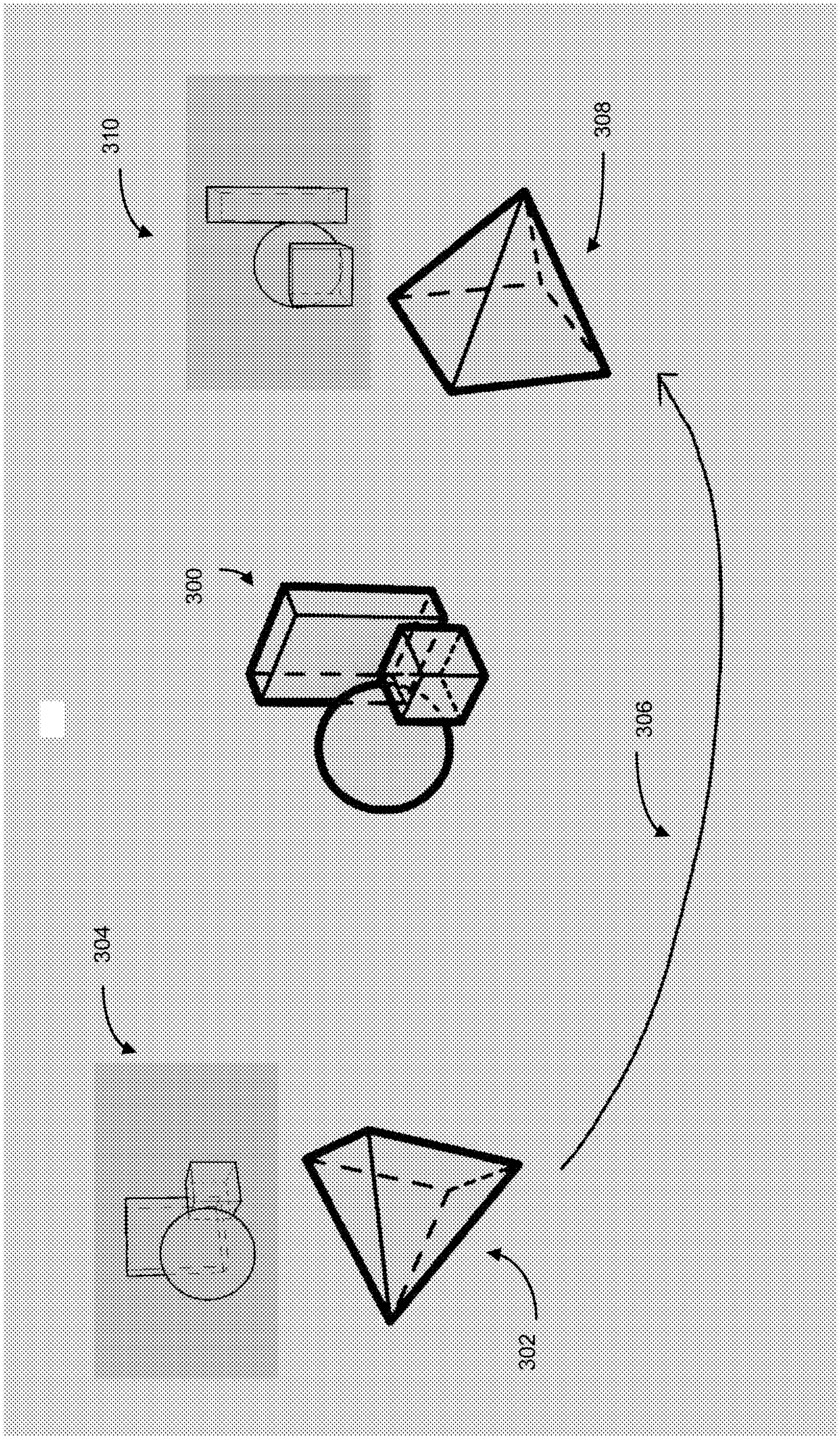
FIG. 3 is an illustration of two camera different viewpoints having different camera parameters, and associated 2D images of a three-dimensional (3D) scene based on the different camera viewpoints, according to some embodiments.

FIG. 3 is an illustration of two camera different viewpoints having different camera parameters, and associated 2D images of a three-dimensional (3D) scene based on the different camera viewpoints, according to some embodiments. FIG. 3 includes, without limitation, a 3D scene 300, initial camera viewpoint 302, initial 2D image 304, translation/rotation 306, modified camera viewpoint 308, and modified 2D image 310.

3D scene 300 may include multiple objects in a three-dimensional world space, where each object has an associated length, width, and depth. The objects included in 3D scene 300 may be static or may be in motion relative to one another.

Initial camera viewpoint 302 represents an initial viewpoint (i.e., a position and orientation in world space) of a camera used to capture an initial 2D image 304 based on 3D scene 300. The apex of initial camera viewpoint 302 represents an initial camera position in world space. The initial camera position may include associated coordinates in world space (e.g., x-, y-, and z-coordinates). The four triangular sides of initial camera viewpoint 302 may collectively define view boundaries associated with the camera (e.g., horizontal and vertical viewing boundaries) determined by an orientation of the camera in world space. The rectangular base of initial camera viewpoint 302 may be parallel to an image plane (not shown) that intersects 3D scene 300.

Intrinsic parameters associated with the camera include a focal length and a principal point. The image plane is determined by the focal length and the location of the camera. The principal point is determined by the intersection of the image plane and a line segment that originates at the apex of the pyramid (i.e., the camera position) and passes through the geometric center of the base of the pyramid to intersect the image plane. The intrinsic parameters associated with the camera remain unchanged as the camera is repositioned or reoriented in world space.

Extrinsic parameters associated with the camera include the 3D location of the camera in world space and the orientation of the camera. Translating or rotating the camera changes one or more of the extrinsic parameters associated with the camera.

Initial 2D image 304 represents a 2D projection of 3D scene 300 based on the intrinsic and extrinsic camera parameters and initial camera viewpoint 302. The image plane is based on the intrinsic focal length associated with the camera, and the geometric center of initial 2D image 3D corresponds to the camera's intrinsic principal point. The relative positions and apparent sizes of objects included in initial 2D image 304 are determined by the extrinsic camera parameters, including the camera position and orientation.

Translation/rotation 306 may modify the position and/or orientation of the camera by changing the location of the camera in world space and/or changing the camera orientation to generate modified camera viewpoint 308. Translation/rotation 306 does not modify the intrinsic camera parameters, such as the focal length or the principal point. Translation/rotation 306 modifies the extrinsic camera parameters, including one or more of the camera position in world space and the camera orientation.

Modified camera viewpoint 308 represents a modified viewpoint (i.e., a modified position and/or orientation in world space) of the camera after application of translation/rotation 306. The apex of modified camera viewpoint 308 represents the modified camera position in world space. The modified camera position may include associated modified coordinates in world space (e.g., modified x-, y-, or z-coordinates). The four triangular sides of modified camera viewpoint 308 may collectively define view boundaries associated with the camera (e.g., horizontal and vertical viewing boundaries) determined by a modified orientation of the camera in world space. The rectangular base of modified camera viewpoint 308 may be parallel to an image plane (not shown) that intersects 3D scene 300. The camera may capture modified 2D image 310 based on modified camera viewpoint 308 and 3D scene 300.

Modified 2D image 310 represents a 2D projection of 3D scene 300 based on the intrinsic and modified extrinsic camera parameters and modified camera viewpoint 308. The image plane is based on the intrinsic focal length associated with the camera, and the geometric center of modified 2D image 3D corresponds to the camera's intrinsic principal point. The relative positions and apparent sizes of objects included in modified 2D image 310 are determined by the modified extrinsic camera parameters, including the modified camera position and/or orientation.

Camera Parameter Estimation

Figure 4:
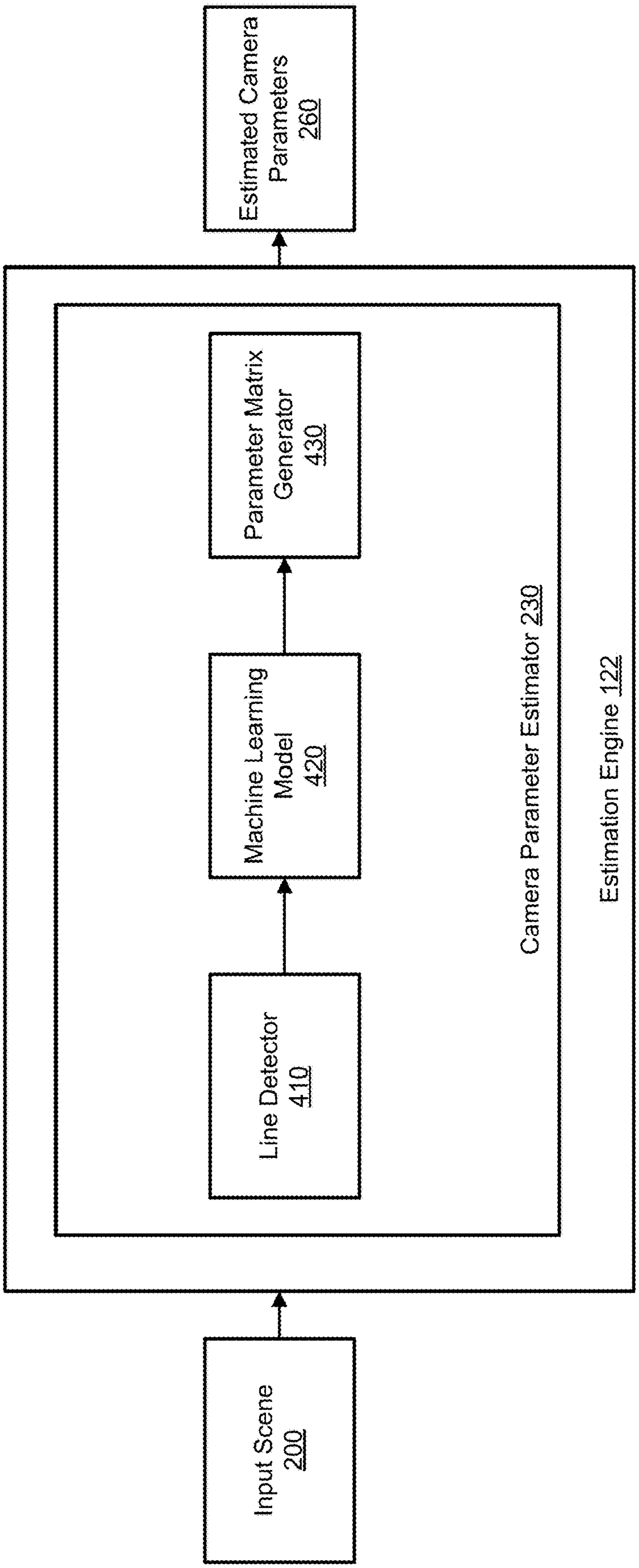
FIG. 4 is a more detailed illustration of camera parameter estimator 230 of FIG. 2, according to some embodiments.

FIG. 4 is a more detailed illustration of camera parameter estimator 230 of FIG. 2, according to some embodiments. Camera parameter estimator 230 analyzes a 2D input scene 200 captured by a camera and generates estimated intrinsic and extrinsic camera parameters for the camera, including a focal length, a principal point, a 3D location in world space, and an orientation in world space. Camera parameter estimator 230 includes, without limitation, line detector 410, machine learning model 420, and parameter matrix generator 430.

Camera parameter estimator receives input scene 200. Input scene 200, as discussed above in reference to FIG. 2, includes a 2D representation of a 3D scene including one or more objects. Input scene 200 is captured by a single camera having an associated camera viewpoint (i.e., a location and orientation in world space).

Line detector 410 analyzes input scene 200 and generates a set of line segments included in input scene 200. A line segment includes a line and two endpoints, where the line and two endpoints collectively describe a substantially straight feature included in input scene 200. Each endpoint may include 2D pixel coordinates locating the endpoint within input scene 200. For example, a depiction of a desk surface included in input scene 200 may include two corners and an edge connecting the two corners. A line segment describing the desk edge may include a line defined by the desk edge, and endpoints defined by 2D pixel locations associated with the two corners. An endpoint included in a line segment may also be defined by an intersection of a feature depicted in input scene 200 and a boundary of input scene 200. As another example, an electrical power line depicted in input scene 200 may extend from the left edge of input scene 200 to the right edge of input scene 200. A line segment representing the electrical power line may include a line defined by the electrical power line and endpoints defined by the intersections of the electrical power line and the left and right edges of input scene 200.

In various embodiments, line detector 410 may identify one or more line segments based on an analysis of color, texture, lighting, and/or contrast information included in input scene 200. Line detector 410 may additionally execute one or more edge detection algorithms, as are known in the art, to object edges included in input scene 200. Line detector 410 may identify object edges that are substantially straight over a predefined pixel distance and identify line segments based on the endpoints of the substantially straight edges. In various embodiments, line detector 410 transforms input scene 200 from image space into a latent feature space and performs a search of the latent feature space representation based on a latent feature vector representation of a straight line. Line detector 410 transmits the generated set of identified line segments to machine learning model 420.

Machine learning model 420 processes the generated set of line segments received from line detector 410 and generates estimated vanishing points associated with input scene 200, as well as estimated relative focal length for the camera used to capture input scene 200. In various embodiments, machine learning model 420 may be a transformer-based neural network classifier.

Machine learning model 420 includes a classifier model that classifies line segments into line segments representing horizontal features included in input scene 200 and line segments representing vertical features included in input scene 200. Machine learning model 420 further estimates one or more possible vanishing points associated with the line segments. For the set of line segments representing horizontal features included in input scene 200, machine learning model 420 identifies one or more line segment intersection points in 2D pixel coordinates, extending each of the line segments beyond the boundaries of input scene 200 if necessary to calculate the intersection point. Each identified intersection point represents a possible vanishing point for the line segments representing horizontal features in input scene 200. Machine learning model 420 also generates possible vanishing points based on the line segments representing vertical features included in input scene 200 in the same manner. Machine learning model 420 calculates a single vanishing point for each of the horizontal and vertical line segment sets. In various embodiments, machine learning model 420 may calculate a weighted average of the possible vanishing points associated with each set of line segments after discarding identified outliers. Machine learning model 420 transmits the single vanishing points associated with each of the horizontal and vertical line segment sets to parameter matrix generator 430.

Machine learning model 420 also calculates a relative focal length for the camera used to capture input scene 200. In various embodiments, machine learning model 420 calculates the relative focal length based on the 2D pixel locations of the generated possible vanishing points. For example, vanishing points that are located within or close to the boundaries of input scene 200 may be associated with a shorter relative focal length, while vanishing points located at greater distances outside of the boundaries of input scene 200 may be associated with a longer relative focal length. Machine learning model 420 transmits the calculated relative focal length to camera parameter estimator 230 for inclusion in estimated camera parameters 260.

Parameter matrix generator 430 receives the vanishing points associated with each of the horizontal and vertical line segment sets from machine learning model 420 and generates a camera parameter matrix. Parameter matrix generator 430 aligns the received horizontal and vertical vanishing points with the world space X-, Y-, and Z-axes. In some embodiments, parameter matrix generator 430 aligns the horizontal vanishing point with the world space X-axis and aligns the vertical vanishing point with the world space Y-axis. Parameter matrix generator 430 determines the orientation of the world-space Z-axis via application of the "right hand rule" as known in the fields of physics and vector mathematics.

Based on the vertical and horizontal vanishing points and the world-space axes, parameter matrix generator 430 generates a parameter matrix describing the extrinsic camera parameters, i.e., the camera location and orientation in world space. In various embodiments, the camera parameter matrix is a 4×4 matrix of real-valued elements, including a 3×3 sub-matrix describing an orientation of the camera in world space, and a 1×4 sub-matrix describing a location of the camera in world space. Parameter matrix generator 430 transmits the parameter matrix to camera parameter estimator 230 for inclusion in estimated camera parameters 260.

Camera parameter estimator 230 calculates a principal point for the camera used to capture input scene 200. As discussed above in reference to FIG. 3, the principal point of a camera is defined by the intersection of a line drawn from the camera position centered within the camera's view angles and the center of an image plane passing through the 3D scene from which input scene 200 is captures. Based on the camera location and orientation information included in the parameter matrix, the estimated relative focal length of the camera, and the geometric center of input scene 200, camera parameter estimator calculates a 3D real-world location corresponding to the principal point for the camera.

Camera parameter estimator 230 generates estimated camera parameters 260 as output. Estimated camera parameters include both intrinsic and extrinsic parameters associated with the camera used to capture input scene 200. The estimated intrinsic parameters include the estimated relative focal length and the principal point discussed above. The estimated extrinsic parameters include the world space camera location and orientation information defined by the camera parameter matrix.

Figure 5:
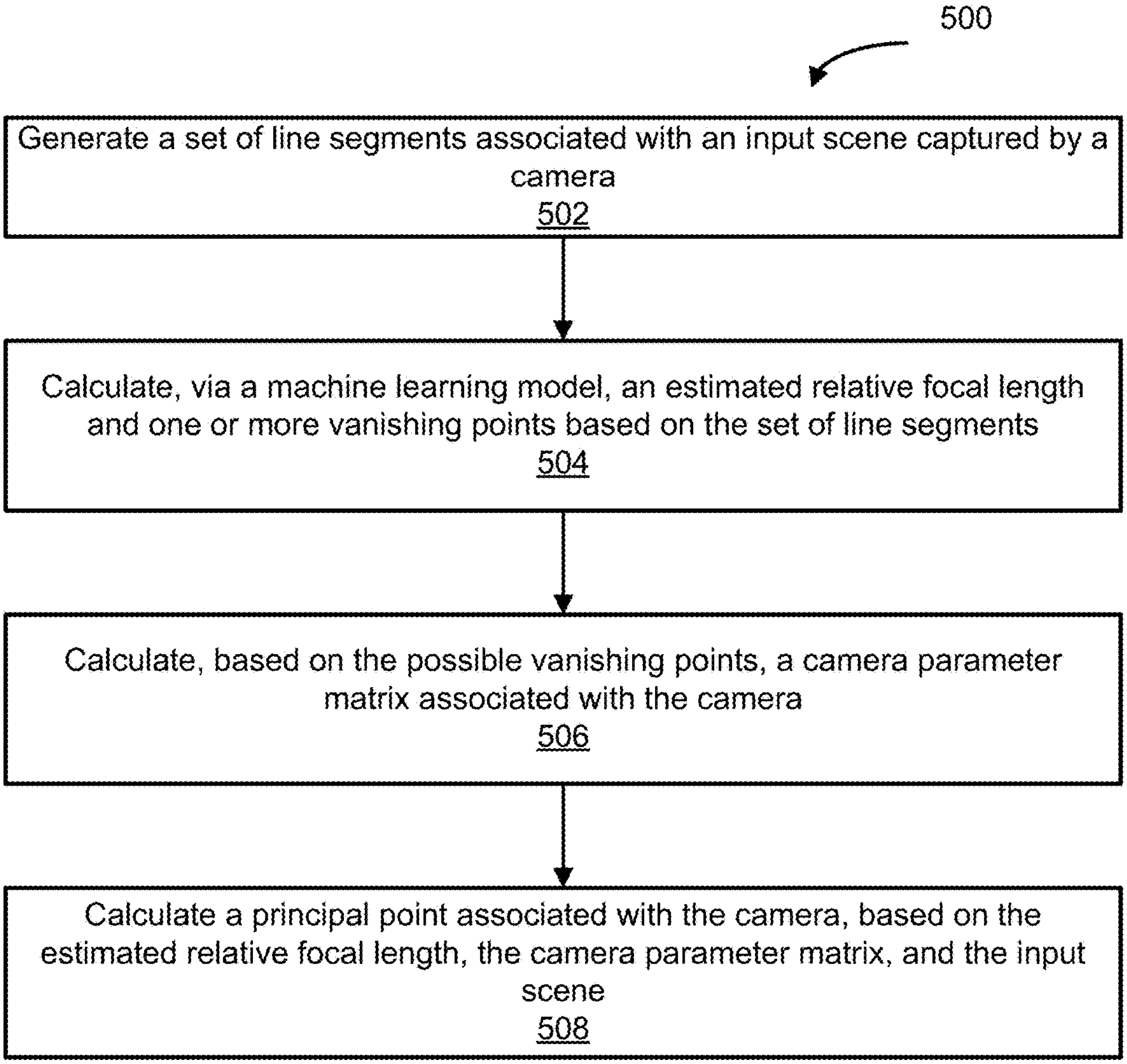
FIG. 5 is a flow diagram of method steps for performing camera parameter estimation, according to some embodiments.

FIG. 5 is a flow diagram of method steps for performing camera parameter estimation, according to some embodiments. Although the method steps are described in conjunction with the systems of FIGS. 1-2 and 4, persons skilled in the art will understand that any system configured to perform the method steps in any order falls within the scope of the present disclosure.

As shown, in operation 502 of method 500, camera parameter estimator 230 receives input scene 200. Input scene 200 includes a 2D representation of a 3D scene including one or more objects and captured by a camera. Line detector 410 of camera parameter estimator 230 generates a set of line segments associated with input scene 200. Each line segment in the set of line segments is associated with a substantially straight feature included in input scene 200 and includes pixel coordinates for two endpoints of the line segment.

In operation 504, machine learning model 420 of camera parameter estimator 230 calculates an estimated relative focal length and one or more vanishing points based on the set of line segments. Machine learning model 420 classifies the line segments included in the set of line segments into line segments representing substantially horizontal features of input scene 200 and line segments representing substantially vertical feature of input scene 200. Machine learning model 420 identifies possible horizontal and vertical vanishing points associated with the two classes of line segments. Each possible vanishing point is located in pixel space at the intersection of two line segments included in the same class of line segments (e.g., horizontal or vertical). Possible vanishing points may be located inside or outside the boundaries of input scene 200. Machine learning model 420 calculates a single vanishing point for each of the horizontal and vertical directions.

Machine learning model 420 calculates an estimated relative focal length for the camera based on the vanishing points. For example, vanishing points that are located within or close to the boundaries of input scene 200 may be associated with a shorter relative focal length, while vanishing points located at greater distances outside of the boundaries of input scene 200 may be associated with a longer relative focal length.

In operation 506, parameter matrix generator 430 generates a camera parameter matrix associated with the camera. The camera parameter matrix is based on aligning the vanishing points calculated by machine learning model 420 with world-space X-, Y-, and Z-axes. The camera parameter matrix includes real-valued elements describing extrinsic values associated with the camera, including a camera position in world space and a camera orientation in world space.

In operation 508, camera parameter estimator 230 generates a principal point associated with the camera, based on the estimated relative focal length, the camera parameter matrix, and the input scene. Based on the camera location and orientation information included in the parameter matrix, the estimated relative focal length of the camera, and the geometric center of input scene 200, camera parameter estimator calculates a 3D real-world location corresponding to the principal point for the camera.

Object Size Estimation and Object Placement

Figure 6:
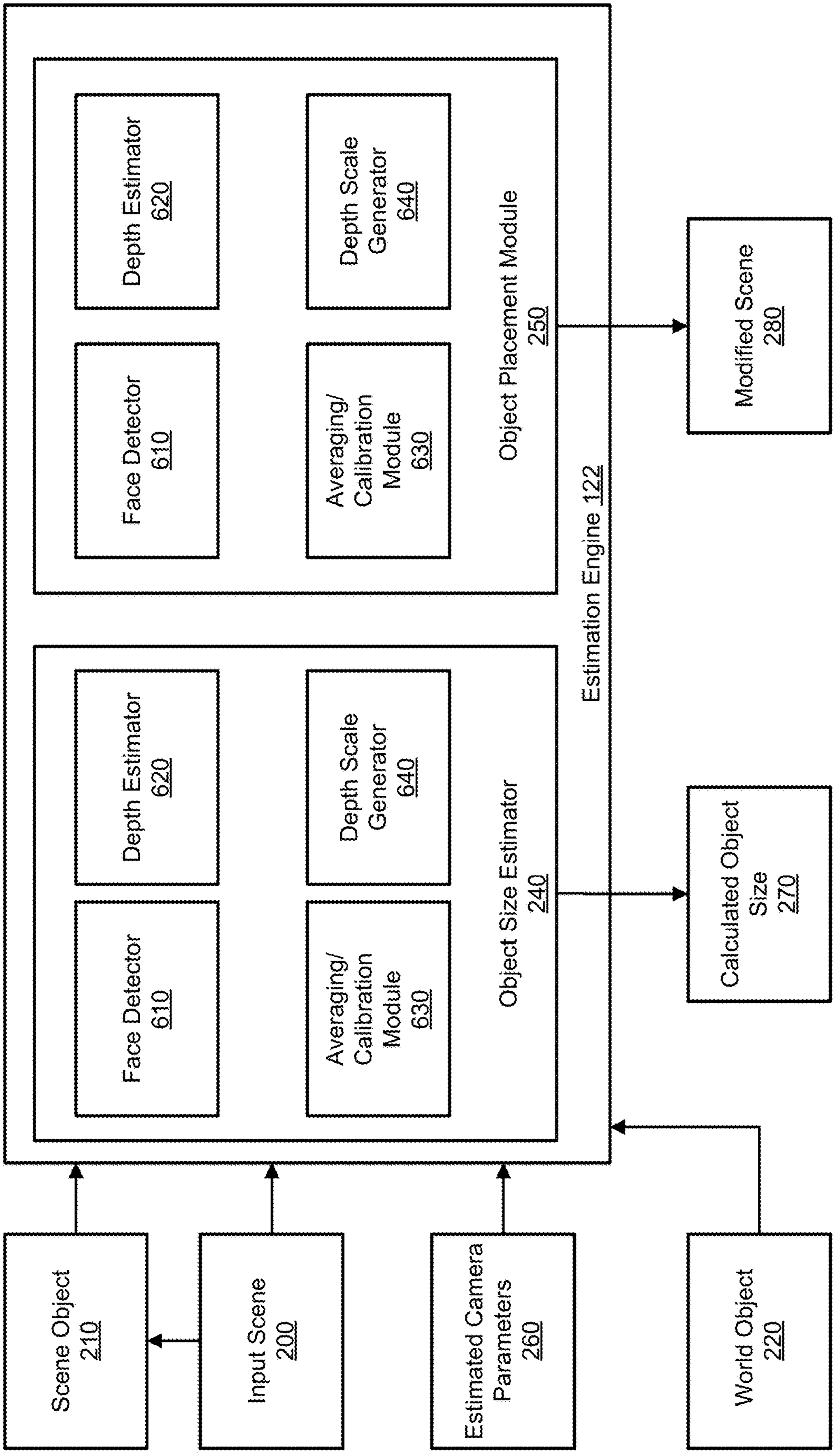
FIG. 6 is a more detailed illustration of object placement module 250 and object size estimator 240 of FIG. 2, according to some embodiments.

FIG. 6 is a more detailed illustration of object size estimator 240 and object placement module 250 of FIG. 2, according to some embodiments. As discussed above, object size estimator 240 estimates real-world dimensions for a scene object 210 included in input scene 200. Object placement module 250 inserts world object 220 into input scene 200 to generate modified scene 280. Each of object size estimator 240 and object placement module 250 may include, without limitation, face detector 610, depth estimator 620, averaging/calibration module 630, and depth scale generator 640. In various embodiments, each of object size estimator 240 and object placement module 250 may include only a subset of these elements or may include additional elements.

Face detector 610 identifies one or more human faces included in input scene 200 and generates a rectangular bounding box associated with each face. Each bounding box includes an associated height and width expressed in pixels, where the height of the bounding box represents the menton-crinion head distance for the associated face. Face detector 610 may further calculate a confidence value for each generated bounding box. In various embodiments, the confidence value may include a dimensionless quantity selected from a continuous range, e.g., between 0 and 1 inclusive.

In various embodiments, face detector 610 performs knowledge-based face detection based on user-supplied rules describing known relative positions of typical facial features, including eyes, a nose, and/or a mouth. Face detector 610 may alternatively or additionally compare portions of input scene 200 to a predefined face template. Face detector 610 may convert input scene 200 into an alternate representation, such as a latent feature space representation, and search the alternate representation for facial features based on one or more latent feature vectors describing facial features. Face detector 610 transmits the one or more identified bounding boxes and associated confidence values to averaging/calibration module 630.

Depth estimator 620 calculates a relative depth value associated with each pixel included in input scene 200. In various embodiments, depth estimator 620 may include one or more machine learning models, such as conditional random fields, convolutional neural networks, deep learning networks, and/or autoencoder/decoder networks.

Depth estimator 620 may analyze input scene 200 and identify visual clues indicating relative depths associated with one or more objects included in input scene 200. For example, depth estimator 620 may determine that an object included in input scene 200 is partially occluded (blocked) by another object included in scene 200. Depth estimator assigns greater relative depth values to one or more pixels associated with the occluded object and assigns smaller relative depth values to one or more pixels associated with the occluding object, indicating that the occluded object is located behind the occluding object in input scene 200. Depth estimator 620 may also identify background regions included in input scene 200, such as a sky, and assign larger relative depth values to one or more pixels associated with the background. Depth estimator 620 may alternatively or additionally identify visual clues based on texture, lighting, shadow, and/or contrast values associated with input scene 200. Depth estimator 620 transmits the calculated relative depth values for each pixel included in input scene 200 to average/calibration module 630.

Averaging/calibration module 630 calculates a relative average head size associated with one or more human faces included in input scene 200, based on the bounding boxes included in input scene 200, the confidence values associated with the bounding boxes, an average head size, and the camera focal length calculated by camera parameter estimator 230. The relative average head size is calculated by the equation:

$$\text{average head size} = \sum_i \frac{\text{head size in pixels}_i * \text{head depth}_i * \text{confidence}_i}{\text{focal length} * \sum_j \text{confidence}_j} \quad (1)$$

where in Equation (1), the head size in pixels for head i is determined by the vertical dimension of the bounding box associated with head i, confidence; represents the confidence value assigned to the bounding box associated with head i by face detector 610, and head $\text{depth}_i$ represents the relative depth of head i determined by depth estimator 620. In various embodiments, averaging/calibration module 630 may assign the relative depth of head i based on the relative depth value associated with the center pixel of the bounding box associated with head i. $\Sigma_j$ $\text{confidence}_j$ represents the summation of the confidence values associated with the i bounding boxes. Averaging/calibration module transmits the calculated relative average head size to depth scale generator 640.

Depth scale generator 640 generates a depth scale that relates pixel dimensions and relative depth values included in input scene 200 to real-world distances:

$$\text{depth scale} = \frac{\text{known mention} - \text{crinion distance}}{\text{average head size}} \quad (2)$$

where the known menton-crinion distance in Equation (2) is, for example, 7.5 inches.

Based on the generated depth scale, a calculated relative depth value associated with a scene object 210 included in input scene 200, and pixel dimensions associated with scene object 210, object size estimator 240 may generate calculated object size 270 that expresses a size associated with scene object 210 in real-world distance units. In some embodiments, estimation engine 122 may generate a bounding box associated with scene object 210 and identify a pixel included in input scene 200 corresponding to the center of the bounding box. Estimation engine 122 assigns the relative depth value associated with scene object 210 based on the relative depth of the pixel included in input scene 200 corresponding to the center of the bounding box.

Object placement module 250 inserts world object 220 into input scene 200 to generate modified scene 280. In various embodiments, object placement module 250 generates a depth scale independently of object size estimator 240, and includes face detector 610, depth estimator 620, averaging/calibration module 630, and depth scale generator 640. In these embodiments, the functions and operations of these elements are the same as described above in reference to object size estimator 240. In other embodiments, object placement module 250 receives the depth scale and relative depth information associated with each pixel included in input scene 200 from object size estimator 240 and does not include face detector 610, depth estimator 620, averaging/calibration module 630, or depth scale generator 640. In embodiments where object placement module 250 includes face detector 610, depth estimator 620, averaging/calibration module 630, and depth scale generator 640, those components may be the same components as included in object size estimator 240 or may be separate additional instances of the components.

Object placement module 250 receives input scene 200 and world object 220. World object 220 includes a 2D depiction of an object, one or more associated size dimensions for the object expressed in real-world units, and a desired insertion point within input scene 200 expressed as 2D pixel coordinates. Based on the relative depth value associated with the desired insertion point, the real-world dimensions of the world object, and the depth scale, object placement module 250 calculates pixel dimensions for the world object and inserts world object 220 into input scene 200. In various embodiments, object placement module 250 may generate a bounding box associated with world object 220 and insert world object 220 into input scene 200 such that the geometric center of the bounding box coincides with the desired insertion point. Object placement module 250 generates modified scene 280 based on input scene 200 and inserted world object 220.

In various embodiments, each of the object size estimation and object placement techniques described above may be performed alone. In other embodiments, the object size estimation techniques may be performed sequentially in any order, or substantially simultaneously, e.g., via parallel operation of object size estimator 240 and object placement module 250.

Figure 7:
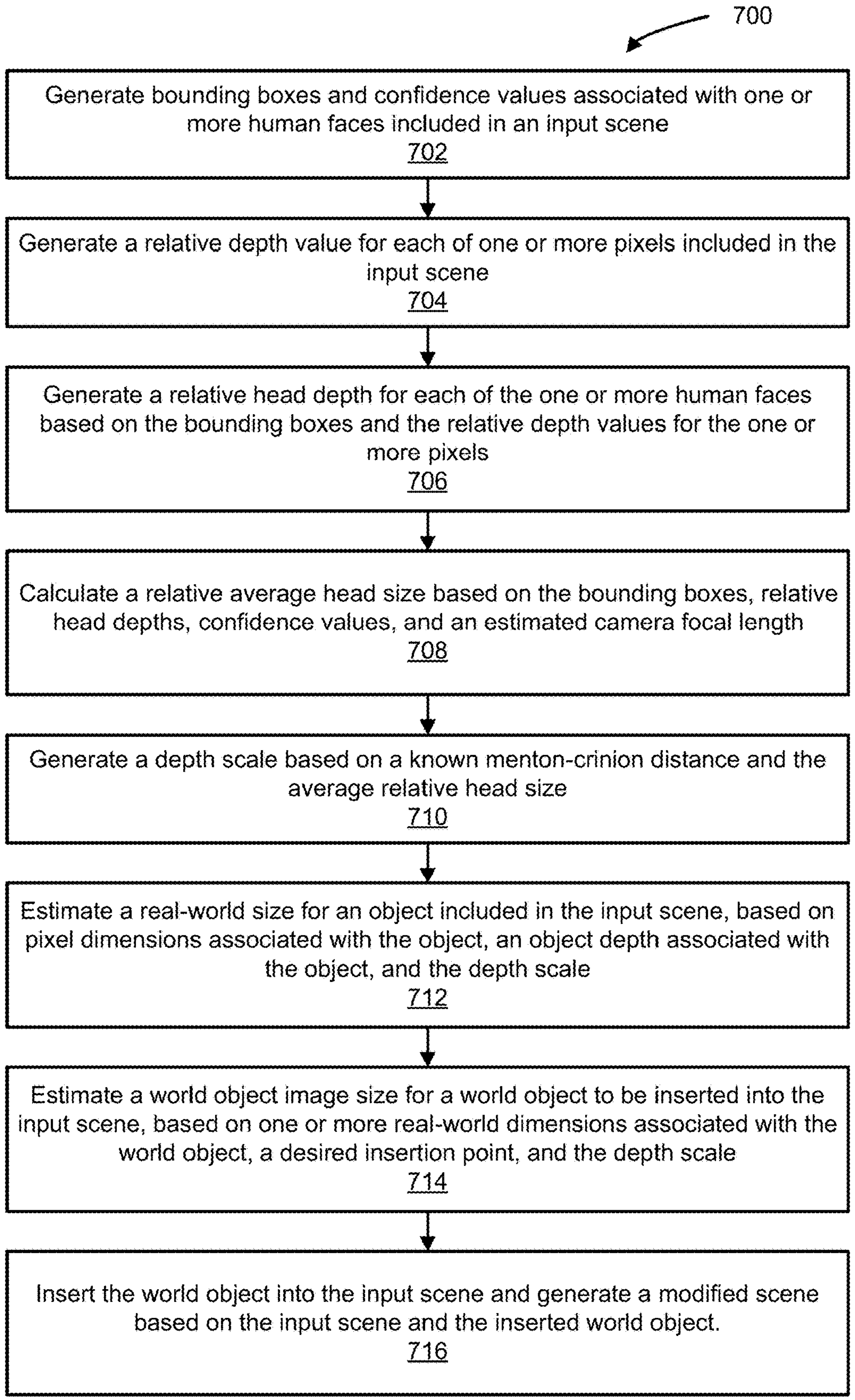
FIG. 7 is a flow diagram of method steps for performing object placement and object size estimation, according to some embodiments.

FIG. 7 is a flow diagram of method steps for performing object placement and object size estimation, according to some embodiments. Although the method steps are described in conjunction with the systems of FIGS. 1-2, 4, and 6, persons skilled in the art will understand that any system configured to perform the method steps in any order falls within the scope of the present disclosure.

As shown, in operation 702 of method 700, estimation engine 122 generates, via face detector 610, bounding boxes and confidence values associated with each of one or more human faces included in input scene 200. Each bounding box includes horizontal and vertical pixel dimensions representing the size of the associated face included in input scene 200. Each confidence value may include a dimensionless quantity selected from a continuous range, e.g., between 0 and 1 inclusive.

In operation 704, estimation engine 122 generates, via depth estimator 620, a relative depth value for each of one or more pixels included in input scene 200. Depth estimator may include one or more machine learning models and may generate relative depth values based on visual depth clues included in input scene 200. Visual depth clues may include objects that are blocked or otherwise occluded by other objects, an identified background region included in input scene 200, or lighting, shadow, texture, or contrast values included in input scene 200.

In operation 706, estimation engine 122 generates a relative head depth for each of the one or more human faces included in input scene 200, based on the bounding box and the relative depth values calculated for one or more pixels associated with the bounding box. For example, estimation engine 122 may calculate a pixel included in input scene 200 corresponding to the geometric center of a bounding box and assign a relative head depth based on the relative depth value of the pixel corresponding to the bounding box center.

In operation 708, estimation engine 122 calculates a relative average head size based on the bounding boxes, relative head depths, confidence values associated with the bounding boxes, and an estimated relative focal length for a camera used to capture input scene 200. The relative average head size calculated by Equation (1) is based on the relationship between a pixel size associated with a head included in input scene 200 and the relative depth of the head in input scene 200 and is scaled by the camera focal length.

In operation 710, estimation engine 122 generates a depth scale based on the calculated relative average head size and a known menton-crinion distance associated with human heads, e.g., 7.5 inches. The generated depth scale relates pixel sizes at a specified relative depth within input scene 200 to real-world measurements.

Estimation engine 122 may perform any of steps 702-710 described above via either or both of object size estimator 240 and object placement module 250. In various embodiments where steps 702-710 are performed in both object size estimator 240 and object placement module 250, each step may be performed substantially simultaneously in both object size estimator 240 and object placement module 250.

In operation 712, estimation engine 122 estimates, via object size estimator 240, one or more real-world size dimensions for a scene object 210 included in input scene 200, based on pixel dimensions associated with scene object 210, an object depth associated with scene object 210, and the depth scale generated in step 710. As described above, the depth scale relates pixel sizes at a given relative depth within input scene 200 to real-world measurement units, such as inches.

In operation 714, estimation engine 122 estimates, via object placement module 250, an image size in pixels for a world object 220 to be inserted into input scene 200. World object 220 includes one or more real-world dimensional measurements associated with world object 220 and a desired insertion point within input scene 200 expressed as a 2D pixel location.

Estimation engine 122 calculates a relative depth value associated with the desired insertion point based on the relative depth values for each pixel in input scene 200 received from depth estimator 620. Estimation engine 122 estimates pixel sizes for world object 220 based on the real-world dimensional measurements, the relative depth value associated with the desired insertion point, and the depth scale.

In operation 716, estimation engine 122 inserts world object 220 into input scene 200 and generates modified scene 280 based on input scene 200 and inserted world object 220. Modified scene 280 includes world object 220 having appropriate pixel dimensions based on the real-world dimensions of world object 220 and the relative depth of the location within input scene 200 into which world object 220 is inserted.

In various embodiments, estimation engine 122 may perform step 712 independently of steps 714-716 or may perform steps 712 and 714-716 sequentially in any order or substantially simultaneously, e.g., via parallel operation of object size estimator 240 an object placement module 250.

In sum, the disclosed techniques perform automated estimation of intrinsic and extrinsic camera parameters based on a single input scene captured by a camera. The disclosed techniques also perform real-world object size estimation for an object included in the input scene and estimate the appropriate image size for a 2D depiction of a world object to be inserted into the input scene.

A camera parameter estimator calculates estimates of intrinsic and extrinsic parameters associated with a camera used to capture an input scene. Intrinsic camera parameters include a relative focal length associated with the camera and a principal point associated with the camera. Extrinsic camera parameters include a location and orientation associated with the camera in 3D world space. The camera parameter estimator identifies a set of line segments included in the input scene, and classifies the line segments into horizontal and vertical line segment classes via a machine learning model. The machine learning model calculates possible vanishing points based on the intersections of line segments included in a line segment class. The machine learning model calculates a horizontal vanishing point based on the possible vanishing points associated with the horizontal class of line segments, and a vertical vanishing point based on the possible vanishing points associated with the vertical class of line segments. The machine learning model also calculates an estimated relative focal length for the camera based on the locations of the possible vanishing points.

A parameter matrix generator generates an extrinsic parameter matrix for the camera based on the vanishing points and the estimated relative focal length. The extrinsic parameter matrix includes real-valued elements that describe the camera location and orientation in world space.

The disclosed object size estimation and object placement techniques rely on the presence of one or more depictions of human head(s) included in an input scene, and may estimate a real-world object size for an object included in the input scene based on the relative sizes of the object and one or more human heads included in the input scene. The disclosed techniques leverage the characteristic that human heads are generally similar in size. For example, the menton-crinion distance associated with a human head is defined as the vertical distance between the bottom of the chin (menton) and the midpoint of the hairline (crinion). The average menton-crinion distance for humans is 7.5 inches for men and 7.0 inches for women, and the middle 90 percent of the human population have a menton-crinion distance that is within 0.7 inches of the average. The disclosed techniques analyze one or more human heads included in an input scene and may estimate a real-world size for an object based on the object size in the input scene relative to the sizes of the one or more heads included in the input scene.

An object size estimator analyzes the input scene and detects one or more human faces included in the input scene. Each human face included in the input scene is associated with a bounding box and a confidence value. The object size estimator also determines a relative depth value for each pixel included in the input scene. The object size estimator relates the bounding box sizes and the relative depth values for pixels included in the bounding boxes to calculate a relationship between head sizes for heads included in the input scene, relative depths associated with each head, and a real-world average head size. Based on the calculated relationship, the object size estimator calculates a depth scale that relates pixels sizes in the input scene to real-world distances for various relative depth values included in the input scene. Object size estimator may calculate an estimated size for an object included in the input scene based on pixel dimensions associated with the object, the object's location within the input scene, and the depth scale.

The disclosed object placement techniques calculate appropriate pixel dimensions for a 2D depiction of a world object to be inserted into the input scene. An object placement module may process the 2D depiction of the world object based on the depth scale generated by the object size estimator or may generate a depth scale via the same techniques used by the object size estimator.

The object placement module receives a 2D depiction of a world object, real-world dimensions of the world object, and a desired insertion point within the input scene. Based on the world object dimensions and a relative depth value associated with the desired insertion point, the object placement module determines appropriate pixels dimensions for the world object and inserts the world object into the input scene to generate a modified scene.

The disclosed object size estimation and object placement techniques may be executed independently, as each of the object size estimator and object placement module includes the necessary components to detect human face, generate estimated relative depth values, and generate a depth scale.

One technical advantage of the disclosed techniques relative to the prior art is that the disclosed techniques provide fully automated determination of scene parameters with minimal manual configuration, improving both accuracy and quality in the generated results. Further, the disclosed techniques may insert an object into the scene while automatically calculating an appropriate size in pixels for the inserted object, improving efficiency in a scene modification workflow. Further, the disclosed techniques require only a single image of a scene generated by a single camera to automatically generate scene parameters, rather than complex, expensive, and error-prone multi-camera capture configurations. These technical advantages provide one or more technological improvements over prior art approaches.

1. In some embodiments, a computer-implemented method for performing estimation of scene parameters comprises identifying, based on a two-dimensional (2D) input scene, one or more line segments included in the input scene, generating one or more vanishing points associated with the input scene based on the one or more line segments, estimating, based on the one or more vanishing points, one or more scene parameters associated with the scene, and inserting a world object into the input scene based on the one or more scene parameters.
2. The computer-implemented method of clause 1, wherein the input scene is captured by a camera and the one or more scene parameters include intrinsic camera parameters.
3. The computer-implemented method of clauses 1 or 2, wherein the intrinsic camera parameters include a relative focal length associated with the camera and a principal point associated with the camera.
4. The computer-implemented method of any of clauses 1-3, wherein the input scene is captured by a camera and the one or more scene parameters include extrinsic camera parameters.
5. The computer-implemented method of any of clauses 1-4, wherein the extrinsic camera parameters include a camera position and a camera orientation.
6. The computer-implemented method of any of clauses 1-5, wherein the world object includes a 2D representation of a three-dimensional (3D) object, one or more real-world size dimensions associated with the world object, and a desired insertion point expressed as a 2D location within the input scene.
7. The computer-implemented method of any of clauses 1-6, wherein generating the one or more vanishing points further comprises classifying, via a machine learning model, each of the one or more line segments based on a horizontal or vertical orientation associated with the line segment.
8. In some embodiments, one or more non-transitory computer-readable media store instructions that, when executed by one or more processors, cause the one or more processors to perform the steps of identifying, based on a two-dimensional (2D) input scene, one or more line segments included in the input scene, generating one or more vanishing points associated with the input scene based on the one or more line segments, estimating, based on the one or more vanishing points, one or more scene parameters associated with the scene, and inserting a world object into the input scene based on the one or more scene parameters.
9. The one or more non-transitory computer-readable media of clause 8, wherein the input scene is captured by a camera and the one or more scene parameters include intrinsic camera parameters.

10. The one or more non-transitory computer-readable media of clauses 8 or 9, wherein the intrinsic camera parameters include a relative focal length associated with the camera and a principal point associated with the camera.

11. The one or more non-transitory computer-readable media of any of clauses 8-10, wherein the input scene is captured by a camera and the one or more scene parameters include extrinsic camera parameters.

12. The one or more non-transitory computer-readable media of any of clauses 8-11, wherein the extrinsic camera parameters include a camera position and a camera orientation.

13. The one or more non-transitory computer-readable media of any of clauses 8-12, wherein the world object includes a 2D representation of a three-dimensional (3D) object, one or more real-world size dimensions associated with the world object, and a desired insertion point expressed as a 2D location within the input scene.

14. The one or more non-transitory computer-readable media of any of clauses 8-13, wherein generating the one or more vanishing points further comprises classifying, via a machine learning model, each of the one or more line segments based on a horizontal or vertical orientation associated with the line segment.

15. In some embodiments, a system comprises one or more memories storing instructions, and one or more processors for executing the instructions to identify, based on a two-dimensional (2D) input scene, one or more line segments included in the input scene, generate one or more vanishing points associated with the input scene based on the one or more line segments, estimate, based on the one or more vanishing points, one or more scene parameters associated with the scene, and insert a world object into the input scene based on the one or more scene parameters.

16. The system of clause 15, wherein the input scene is captured by a camera and the one or more scene parameters include intrinsic camera parameters.

17. The system of clauses 15 or 16, wherein the intrinsic camera parameters include a relative focal length associated with the camera and a principal point associated with the camera.

18. The system of any of clauses 15-17, wherein the input scene is captured by a camera and the one or more scene parameters include extrinsic camera parameters.

19. The system of any of clauses 15-18, wherein the extrinsic camera parameters include a camera position and a camera orientation.

20. The system of any of clauses 15-19, wherein the world object includes a 2D representation of a three-dimensional (3D) object, one or more real-world size dimensions associated with the world object, and a desired insertion point expressed as a 2D location within the input scene.

21. In some embodiments, a computer-implemented method for estimating a real-world size of an object included in an input scene method comprises identifying one or more depictions of human faces included in a two-dimensional (2D) input scene captured by a camera, generating one or more bounding boxes associated with the input scene, where each bounding box represents a head size associated with a different one of the one or more depictions of human faces, calculating a relative depth value for each of one or more pixels included in the input scene that correspond to the one or more bounding boxes, calculating an average relative head size based on the one or more bounding boxes and relative depth values associated with the one or more pixels, and generating a depth scale based on the average relative head size and a known real-world dimension of an average human head.

22. The computer-implemented method of clause 21, wherein the input scene includes a 2D representation of a three-dimensional (3D) scene captured by a camera, and calculating the average relative head size is further based on a relative focal length associated with the camera.

23. The computer-implemented method of clauses 21 or 22, wherein calculating the average relative head size is further based on one or more confidence values associated with the one or more bounding boxes.

24. The computer-implemented method of any of clauses 21-23, wherein the known real-world dimension of the average human head comprises a menton-crinion distance.

25. The computer-implemented method of any of clauses 21-24, further comprising estimating one or more real-world dimensions for a scene object included in the input scene based on the depth scale and one or more pixel dimensions associated with the scene object.

26. The computer-implemented method of any of clauses 21-25, further comprising estimating, for a world object including one or more real-world object dimensions and a specified insertion point within the input scene, one or more pixel dimensions associated with the world object based on the one or more real-world object dimensions, the specified insertion point, and the depth scale.

27. The computer-implemented method of any of clauses 21-26, further comprising generating a modified scene based on the input scene, the world object, and the specified insertion point.

28. In some embodiments, one or more non-transitory computer-readable media store instructions that, when executed by one or more processors, cause the one or more processors to perform the steps of identifying one or more depictions of human faces included in a two-dimensional (2D) input scene captured by a camera, generating one or more bounding boxes associated with the input scene, where each bounding box represents a head size associated with a different one of the one or more depictions of human faces, calculating a relative depth value for each of one or more pixels included in the input scene that correspond to the one or more bounding boxes, calculating an average relative head size based on the one or more bounding boxes and relative depth values associated with the one or more pixels, and generating a depth scale based on the average relative head size and a known real-world dimension of an average human head.

29. The one or more non-transitory computer-readable media of clause 28, wherein the input scene includes a 2D representation of a three-dimensional (3D) scene captured by a camera, and calculating the average relative head size is further based on a relative focal length associated with the camera.

30. The one or more non-transitory computer-readable media of clauses 28 or 29, wherein calculating the average relative head size is further based on one or more confidence values associated with the one or more bounding boxes.

31. The one or more non-transitory computer-readable media of any of clauses 28-30, wherein the known real-world dimension of the average human head comprises a menton-crinion distance.
32. The one or more non-transitory computer-readable media of any of clauses 28-31, further comprising estimating one or more real-world dimensions for a scene object included in the input scene based on the depth scale and one or more pixel dimensions associated with the scene object.
33. The one or more non-transitory computer-readable media of any of clauses 28-32, further comprising estimating, for a world object including one or more real-world object dimensions and a specified insertion point within the input scene, one or more pixel dimensions associated with the world object based on the one or more real-world object dimensions, the specified insertion point, and the depth scale.
34. The one or more non-transitory computer-readable media of any of clauses 28-33, further comprising generating a modified scene based on the input scene, the world object, and the specified insertion point.
35. In some embodiments, a system comprises one or more memories storing instructions, and one or more processors for executing the instructions to identify one or more depictions of human faces included in a two-dimensional (2D) input scene captured by a camera, generate one or more bounding boxes associated with the 2D input scene, where each bounding box represents a head size associated with a different one of the one or more human faces, calculate a relative depth value for each of one or more pixels included in the input scene that correspond to the one or more bounding boxes, calculate an average relative head size based on the one or more bounding boxes and relative depth values associated with the one or more pixels, and generate a depth scale based on the average relative head size and a known real-world dimension of an average human head.
36. The system of clause 35, wherein the input scene includes a 2D representation of a three-dimensional (3D) scene captured by a camera, and calculating the average relative head size is further based on a relative focal length associated with the camera.
37. The system of clauses 35 or 36, wherein calculating the average relative head size is further based on one or more confidence values associated with the one or more bounding boxes.
38. The system of any of clauses 35-37, wherein the known real-world dimension of the average human head comprises a menton-crinion distance.
39. The system of any of clauses 35-38, wherein the instructions further cause the one or more processors to estimate one or more real-world dimensions for a scene object included in the input scene based on the depth scale and one or more pixel dimensions associated with the scene object.
40. The system of any of clauses 35-39, wherein the instructions further cause the one or more processors to estimate, for a world object including one or more real-world object dimensions and a specified insertion point within the input scene, one or more pixel dimensions associated with the world object based on the one or more real-world object dimensions, the specified insertion point, and the depth scale, and generate a modified scene based on the input scene, the world object, and the specified insertion point.

Any and all combinations of any of the claim elements recited in any of the claims and/or any elements described in this application, in any fashion, fall within the contemplated scope of the present invention and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing estimation of scene parameters, the computer-implemented method comprising:

transforming a two-dimensional (2D) input scene from an image space representation into a latent feature space representation;

performing a search of the latent feature space representation based at least on a latent feature vector representation of a straight line;

identifying one or more straight line segments included in the input scene based at least on one or more results obtained from the search;

generating one or more vanishing points associated with the input scene based on the one or more line segments;

estimating, based on the one or more vanishing points, one or more scene parameters associated with the scene; and inserting a world object into the input scene based on the one or more scene parameters.

2. The computer-implemented method of claim 1, wherein the input scene is captured by a camera and the one or more scene parameters include intrinsic camera parameters.

3. The computer-implemented method of claim 2, wherein the intrinsic camera parameters include a relative focal length associated with the camera and a principal point associated with the camera.

4. The computer-implemented method of claim 1, wherein the input scene is captured by a camera and the one or more scene parameters include extrinsic camera parameters.

5. The computer-implemented method of claim 4, wherein the extrinsic camera parameters include a camera position and a camera orientation.

6. The computer-implemented method of claim 1, wherein the world object includes a 2D representation of a three-dimensional (3D) object, one or more real-world size dimensions associated with the world object, and a desired insertion point expressed as a 2D location within the input scene.

7. The computer-implemented method of claim 1, wherein generating the one or more vanishing points further comprises classifying, via a machine learning model, each of the one or more line segments based on a horizontal or vertical orientation associated with the line segment.

8. One or more non-transitory computer-readable media storing instructions that, when executed by one or more processors, cause the one or more processors to perform the steps of:

transforming a two-dimensional (2D) input scene from an image space representation into a latent feature space representation;

performing a search of the latent feature space representation based at least on a latent feature vector representation of a straight line;

identifying one or more straight line segments included in the input scene based at least on one or more results obtained from the search;

generating one or more vanishing points associated with the input scene based on the one or more line segments;

estimating, based on the one or more vanishing points, one or more scene parameters associated with the scene; and inserting a world object into the input scene based on the one or more scene parameters.

9. The one or more non-transitory computer-readable media of claim 8, wherein the input scene is captured by a camera and the one or more scene parameters include intrinsic camera parameters.

10. The one or more non-transitory computer-readable media of claim 9, wherein the intrinsic camera parameters include a relative focal length associated with the camera and a principal point associated with the camera.

11. The one or more non-transitory computer-readable media of claim 8, wherein the input scene is captured by a camera and the one or more scene parameters include extrinsic camera parameters.

12. The one or more non-transitory computer-readable media of claim 11, wherein the extrinsic camera parameters include a camera position and a camera orientation.

13. The one or more non-transitory computer-readable media of claim 8, wherein the world object includes a 2D representation of a three-dimensional (3D) object, one or more real-world size dimensions associated with the world object, and a desired insertion point expressed as a 2D location within the input scene.

14. The one or more non-transitory computer-readable media of claim 8, wherein generating the one or more vanishing points further comprises classifying, via a machine learning model, each of the one or more line segments based on a horizontal or vertical orientation associated with the line segment.

15. A system comprising:

one or more memories storing instructions; and one or more processors for executing the instructions to:

transform a two-dimensional (2D) input scene from an image space representation into a latent feature space representation;

perform a search of the latent feature space representation based at least on a latent feature vector representation of a straight line;

identify one or more straight line segments included in the input scene based at least on one or more results obtained from the search;

generate one or more vanishing points associated with the input scene based on the one or more line segments;

estimate, based on the one or more vanishing points, one or more scene parameters associated with the scene; and insert a world object into the input scene based on the one or more scene parameters.

16. The system of claim 15, wherein the input scene is captured by a camera and the one or more scene parameters include intrinsic camera parameters.

17. The system of claim 16, wherein the intrinsic camera parameters include a relative focal length associated with the camera and a principal point associated with the camera.

18. The system of claim 15, wherein the input scene is captured by a camera and the one or more scene parameters include extrinsic camera parameters.

19. The system of claim 18, wherein the extrinsic camera parameters include a camera position and a camera orientation.

20. The system of claim 15, wherein the world object includes a 2D representation of a three-dimensional (3D) object, one or more real-world size dimensions associated with the world object, and a desired insertion point expressed as a 2D location within the input scene.

* * * * *